(12) United States Patent
Sampathkumar et al.

(10) Patent No.: US 9,916,170 B2
(45) Date of Patent: Mar. 13, 2018

(54) CLOUD COMPUTING SIMULATOR

(71) Applicant: VMware, Inc., Palo Alto, CA (US)

(72) Inventors: Badhrinath Sampathkumar, Sunnyvale, CA (US); Yongkun Gui, Mountain View, CA (US)

(73) Assignee: VMWARE, INC., Palo Alto, CA (US)

( * ) Notice: Subject to any disclaimer, the term of this patent is extended or adjusted under 35 U.S.C. 154(b) by 8 days.

(21) Appl. No.: 14/983,765

(22) Filed: Dec. 30, 2015

(65) Prior Publication Data

US 2017/0192802 A1     Jul. 6, 2017

(51) Int. Cl.
*G06F 9/455* (2006.01)
*G06F 9/50* (2006.01)

(52) U.S. Cl.
CPC ...... *G06F 9/45508* (2013.01); *G06F 9/45558* (2013.01); *G06F 9/5077* (2013.01); *G06F 2009/4557* (2013.01)

(58) Field of Classification Search
None
See application file for complete search history.

(56) References Cited

U.S. PATENT DOCUMENTS

| | | | | |
|---|---|---|---|---|
| 7,793,297 | B2* | 9/2010 | Aggarwal | G06F 9/5044 709/226 |
| 2009/0300173 | A1* | 12/2009 | Bakman | G06F 11/008 709/224 |
| 2012/0020371 | A1* | 1/2012 | Nemawarkar | G06F 15/167 370/412 |
| 2012/0023498 | A1* | 1/2012 | Sundararaman | H04L 47/621 718/102 |
| 2012/0066667 | A1* | 3/2012 | Mascaro | G06F 9/5066 717/127 |

* cited by examiner

*Primary Examiner* — Dong Kim
(74) *Attorney, Agent, or Firm* — Thomas Horstemeyer, LLP

(57) ABSTRACT

A method for simulating a virtual computing environment includes specifying one or more flavors of resource consumers and one or more flavors of datastores to be provisioned on a tree of hosts for a simulation of a distributed virtualization scheduler. The method also includes generating a tree of hosts for the resource consumers and datastores based on the specified flavors and using a tree generator component of the distributed virtualization scheduler. The method further includes generating a plurality of resource consumer requests for the generated tree of hosts according to a pattern-based input, where the resource consumer requests include requests for the specified resource consumer flavors and the specified datastore flavors. The method also includes simulating execution of the resource consumer requests on the generated tree of hosts using the distributed virtualization scheduler, and utilizing a result of the simulated execution to improve a placement decision for a resource consumer.

20 Claims, 4 Drawing Sheets

CLOUD COMPUTING SIMULATOR

BACKGROUND

A virtual computing environment may include a very large number of host computers. A host computer provides a virtualization layer for hosting one or more virtual machines (VMs). A virtualization management module carries out administrative tasks for the virtual computing environment, including managing hosts, managing VMs running within each host, provisioning VMs, migrating VMs from one host to another host, and load balancing between hosts. In order to verify that a virtualization management module will work properly at a large scale, simulations of the virtualization management module need to be performed. Existing simulators are handcrafted simulators that require a user to explicitly lay out the topology of the virtual computing environment: the number of hosts, the connections to datastores, etc. Building a topology manually becomes very difficult when the virtual computing environment contains hundreds or even thousands of hosts.

SUMMARY

One or more embodiments provide techniques for simulating a virtual computing environment. A method for simulating a virtual computing environment includes specifying one or more flavors of resource consumers and one or more flavors of datastores to be provisioned on a tree of hosts for a simulation of a distributed virtualization scheduler. The method also includes generating a tree of hosts for the resource consumers and datastores based on the specified flavors of resource consumers and datastores and using a tree generator component of the distributed virtualization scheduler. The method further includes generating a plurality of resource consumer requests for the generated tree of hosts according to a pattern-based input, where the resource consumer requests include requests for the specified resource consumer flavors and the specified datastore flavors. The method also includes simulating execution of the resource consumer requests on the generated tree of hosts using the distributed virtualization scheduler. The method further includes utilizing a result of the simulated execution to improve a placement decision for a resource consumer.

According to another embodiment, a non-transitory computer-readable storage medium contains a program which, when executed by one or more processors, performs operations for simulating a virtual computing environment as set forth above.

According to yet another embodiment, a system includes a processor and a memory, wherein the memory includes a program executable in the processor to perform operations for simulating a virtual computing environment as set forth above.

DETAILED DESCRIPTION

Figure 1:
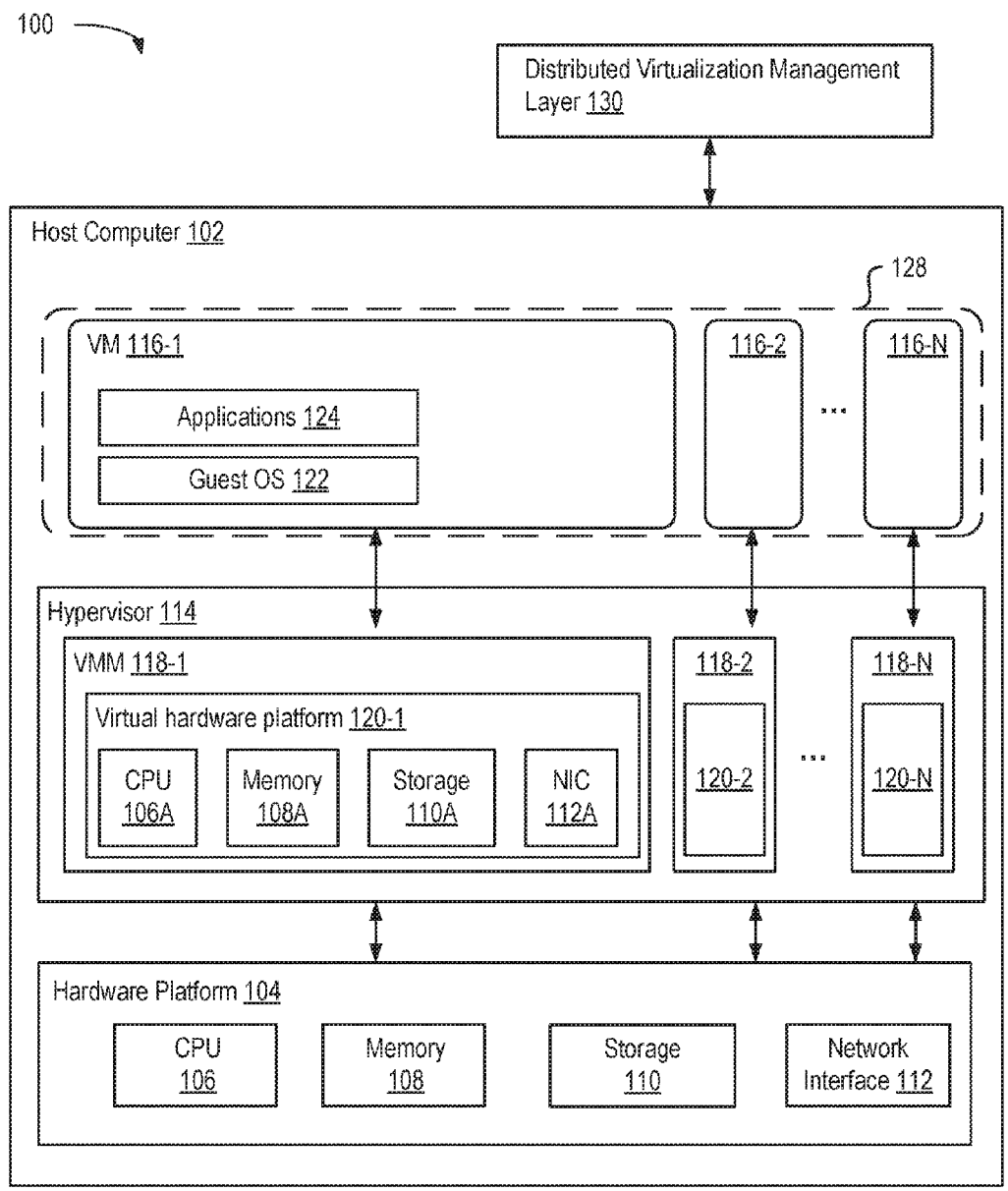
FIG. 1 is a block diagram that illustrates a computing system in accordance with one embodiment.

Embodiments described herein provide a method for simulating a distributed virtualization management module. A scheduler for a distributed virtualization management module is a software component that finds optimal assignments of resource consumers to available resources. The purpose of the scheduler is to match the needs of a resource consumer to specific resources. Such a matching operation is also called a "placement." For example, the scheduler may obtain a placement of a VM on a specific host computer in a cluster of such computers, and the VM may then be created on the specific host computer. In other embodiments, a container may be the resource consumer that is matched to specific resources. Other distributed applications besides VMs or containers may be matched as well.

Instead of manually laying out a virtual computing environment (i.e., a cluster or tree of hosts), embodiments described herein build the environment using probabilistic scenarios. Configurations and variables are specified and the simulator builds out the environment automatically. This methodology allows the simulation to be scaled to arbitrarily large numbers. Embodiments described herein also allow for "what-if" scenarios: a simulation is run, observations are made, conditions are modified, the simulation is run again, etc. The scenarios can be tweaked by modifying probability distributions of hosts, VMs, containers, resource consumers, datastores, etc. For example, the user can modify conditions slightly to see if the new simulation results in better placement of VMs or containers among hosts, better overall balance of VMs or containers among the hosts, better performance, etc. Embodiments described herein can simulate large-scale scenarios of a real cloud topology. Once a topology is created, individual requests for resource consumers do not need to be created for the simulation. Instead, a broad picture of the type of requests is specified. Simulations are also repeatable so that simulation metrics can be reviewed to evaluate a scenario's effectiveness. Simulation results may be used to improve a placement decision for resource consumers in some embodiments.

In embodiments described herein, VMs are sometimes used as an example resource consumer. However, it should be understood that the resource consumer can comprise any time of distributed application, such as containers or other applications. Therefore, even though VMs are used for simplicity in some examples herein, other embodiments are within the scope of this disclosure.

Reference will now be made in detail to several embodiments, examples of which are illustrated in the accompanying figures. It is noted that wherever practicable similar or like reference numbers may be used in the figures and may indicate similar or like functionality. The figures depict embodiments for purposes of illustration only. One skilled in the art will readily recognize from the following description that alternative embodiments of the structures and method illustrated herein may be employed without departing from the principles described herein.

FIG. 1 is a block diagram that illustrates a computing system 100 with which one or more embodiments of the present disclosure may be utilized. As illustrated, computing system 100 includes at least one host computer 102. Although a single host is depicted in FIG. 1, it is recognized that computing system 100 may include a plurality of host computers 102, which can be arranged in an interconnected server system such as a data center.

Host 102 is configured to provide a virtualization layer that abstracts computing resources of a hardware platform 104 into multiple resource consumers, such as virtual machines (VMs) 116 that run concurrently on the same host 102. Hardware platform 104 of host 102 includes CPU 106, memory 108, storage 110, networking interface 112, and other conventional components of a computing device. VMs 116 run on top of a software interface layer, referred to herein as a hypervisor 114, that enables sharing of the hardware resources of host 102 by the virtual machines. One example of hypervisor 114 that may be used in an embodiment described herein is a VMware ESXi™ hypervisor provided as part of the VMware vSphere® solution made commercially available from VMware, Inc of Palo Alto, Calif. Hypervisor 114 provides a device driver layer configured to map physical resource of hardware platforms 104 to "virtual" resources of each VM 116 such that each VM 116-1 to 116-N has its own corresponding virtual hardware platform (e.g., a corresponding one of virtual hardware platforms 120-1 to 120-1N). Each such virtual hardware platform 120 provides emulated hardware (e.g., memory 108A, processor 106A, storage 110A, network interface 112A, etc.) that may, for example, function as an equivalent, conventional hardware architecture for its corresponding VM 116. Virtual hardware platforms 120-1 to 120-N may be considered part of virtual machine monitors (VMMs) 118-1 to 118-N which implement virtual system support to coordinate operations between hypervisor 114 and corresponding VMs 116-1 to 116-N in the pool of VMs 128.

Hypervisor 114 may run on top of a host operating system of host 102 or directly on hardware components of host 102. Each VM 116 includes a guest operating system 122 (e.g., Microsoft Windows®, Linux™) and one or more guest applications and processes running on top of guest operating system 122.

Computing system 100 includes distributed virtualization management layer 130 that may communicate with the one or more hosts 102. Distributed virtualization management layer 130 is configured to carry out administrative tasks for the computing system 100, including managing hosts 102, managing VMs running within each host 102, provisioning VMs, migrating VMs from one host to another host, and load balancing between hosts 102. In one embodiment, distributed virtualization management layer 130 is a computer program that resides and executes in a central server, which may reside in computing system 100, or alternatively, running as a VM in one of hosts 102. One example of a distributed virtualization management layer 130 is the ESX-Cloud product made available from VMware, Inc. A distributed virtualization management layer 130 may comprise a distributed architecture made up of a plurality of nodes. Examples of nodes are illustrated in greater detail in FIG. 3. Nodes can comprise microservices, VMs, or containers, or other resource consumers running on hosts in some embodiments. In one embodiment, a distributed scheduler is organized into a hierarchy, such as a tree of schedulers, or into multiple such hierarchies. Placement requests issued to a root scheduler of the hierarchy are propagated down, either to all children or to randomly selected subsets of children of each branch scheduler in the hierarchy, until reaching leaf schedulers of the hierarchy which each monitor available resources in a distinct resource bucket. Actions of the leaf, branch, and root schedulers may be performed by agents on host computers.

One component of a distributed virtualization management layer 130 is determining where to place a VM (or other resource consumer) that a user requests to be powered on. A distributed virtualization management layer 130 builds a hierarchy of systems and employs one or more schedulers, which may be known as distributed virtualization schedulers. As an example, a root level scheduler schedules among a subset of leaf level schedulers, and the leaf level schedulers schedule among a subset of hosts. A scheduler may have a certain number of hosts that the scheduler can manage, such as 32 hosts. In one scenario, a root scheduler manages 32 branch schedulers, and each branch scheduler manages 32 hosts each. That scenario provides about 1000 hosts. The distributed virtualization management layer 130 can thus use the distributed virtualization schedulers to quickly create a large number of hosts.

When the number of hosts reaches into the hundreds or thousands, laying out a simulation environment can become too difficult for a user. Embodiments described herein allow a user to specify a small number of configurations, and the simulator builds out the virtual computing environment using the distributed virtualization scheduling resources of the distributed virtualization management layer 130, such as a leaf scheduler and a branch scheduler. A user may specify, for example, that each host is connected to 2-4 datastores, that each scheduler is responsible for X hosts at each level, that each root scheduler is responsible for Y schedulers, etc. The simulator then "builds out" the virtual computing environment (i.e., a tree of hosts) using these variables.

In actual implementations of a virtual computing environment, the network or tree of hosts is dynamic. In operation, various VMs are running and each VM is generating a load. The load profile is an indicator of the utilization of resources of a host or hosts. The simulator described herein can simulate the impact that additional VMs have on the load profile. Simulation metrics can also be used to evaluate the effectiveness of the distributed virtualization management layer 130 (i.e., the effectiveness of the distributed virtualization schedulers). That is, the simulator can determine how well the distributed virtualization scheduler or schedulers are performing for a specific scenario. One simulation metric used to gauge the effectiveness of the distributed virtualization management layer 130 is the number of VM requests that succeeded or failed. Another metric that can be used is the state of the hosts at the end of the simulation run: what was the average utilization and standard deviation of the hosts, which indicates the balance of the cluster of hosts. A user might also look at how spikes in VM requests were handled, or how batch requests were handled. Any other suitable metrics may be utilized to determine the effectiveness of the distributed virtualization management layer 130.

Certain embodiments of the present disclosure comprise a read-eval-print-loop (REPL) style simulator. A REPL environment takes single user inputs, evaluates them, and returns the result to the user. The simulation setup and tests may be described using YAML (YAML Ain't Markup Language) files or any suitable markup language. The simulation may run in a single Python process. Multiple simulations may be run at a time, each on a different processor. The simulations running on the different processors may have different topologies while running at the same time. This structure of the simulation allows for rapid prototyping: a change can be made to the scheduler and the user can quickly see the effect it has on the simulation.

Figure 2:
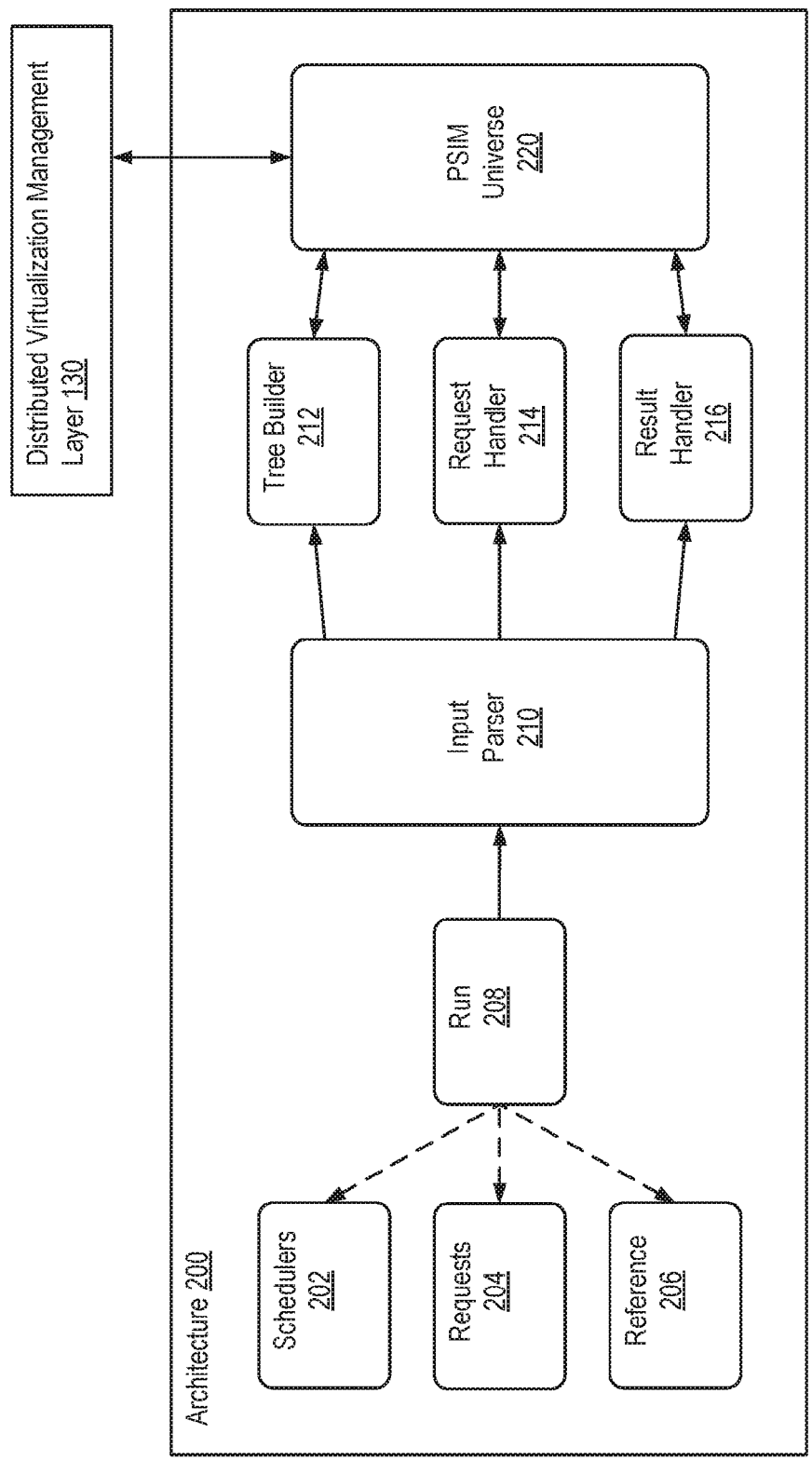
FIG. 2 illustrates an example architecture of a cloud simulator in accordance with one embodiment.

FIG. 2 illustrates an example architecture 200 of a cloud simulator in accordance with one embodiment. The architecture 200 can be run on any suitable computing system, comprising at least a processor and memory. The architecture 200 shares the actual scheduling and creation logic with the scheduler or schedulers of the distributed virtualization management layer 130. The results of the simulator can therefore be used to validate the distributed virtualization management layer 130.

Schedulers 202 include one or more configuration files that describe how schedulers can be set up. Requests 204 include one or more configuration files that describe the kind of VM requests that will be input to the distributed virtualization management layer 130. Reference 206 is a configuration file used to validate a scenario once the scenario has been run. Run 208 is a run descriptor that retrieves information from the scheduler 202, requests 204, and reference 206 files and transmits that information to input parser 210. Input parser 210 parses the configuration files and sends various information regarding the configuration files to the other components in the architecture 200, so that the other components can prepare and execute the simulation.

Tree builder 212 builds the scheduler hierarchy. Request handler 214 manages the VMs that will be generated for the simulation. The embodiments described herein can generate a mixture of VMs. Different VM types are known as VM flavors. As an example, one VM flavor may have one PCPU (physical central processing unit), while another VM flavor has four PCPUs. Another flavor may have more memory, etc. The distributed virtualization management layer 130 may have predefined flavors of VMs. These predefined flavors are used in the simulation to simulate the real-world scenarios encountered by the distributed virtualization management layer 130. The flavors in the simulation can be designated by a ratio, such as a ratio of 4:3:2:1 for four different flavors. Request handler 214 generates the requests in the proper requested ratios. Request handler 214 also determines if the requests can be handled by the hosts.

Result handler 216 determines the quality of the simulation after the simulation is performed. The results handler can compare the results of the simulation to a reference to make this comparison. The reference can include one or more metrics for determining the quality of the results of the simulation.

A PSIM (placement simulator) Universe module 220 interacts with the scheduler and agents of the distributed virtualization management layer 130, as illustrated here and in FIG. 3 below. The PSIM Universe module 220 performs the simulation.

Figure 3:
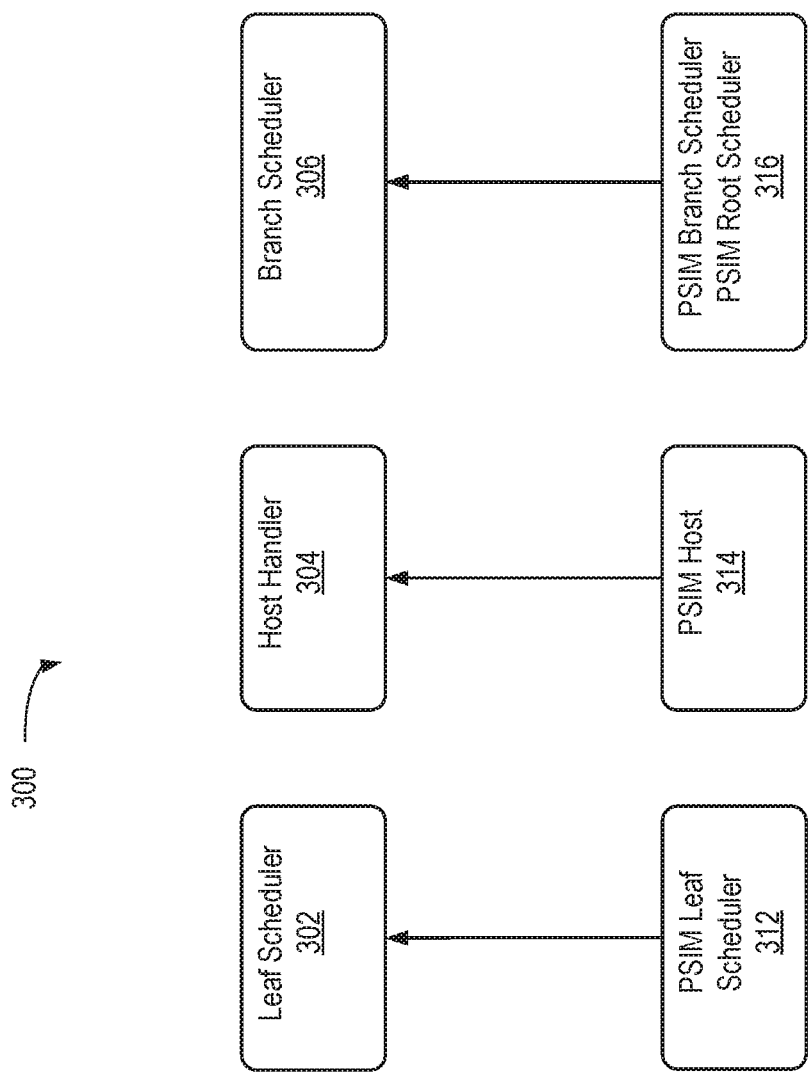
FIG. 3 illustrates an example implementation of a simulator according to an embodiment.

FIG. 3 illustrates an example implementation 300 of a simulator according to an embodiment. PSIM Universe components PSIM leaf scheduler 312, PSIM host 314, and PSIM branch scheduler/PSIM root scheduler 316 override the thread implementations in the real classes with respect to leaf scheduler 302, host handler 304, and branch scheduler 306.

The PSIM Universe 220 interacts with the components of the distributed virtualization management layer 130 to perform the simulation. The simulation uses an actual leaf scheduler 302, host handler 304, and branch scheduler 306 of the distributed virtualization management layer 130. This allows the simulation to effectively test the performance of the distributed virtualization management layer 130. The PSIM Universe module 220 simulates the leaf scheduler with PSIM leaf scheduler 312. The PSIM Universe module 220 simulates the host handler with a PSIM host 314. The PSIM Universe module 220 simulates the branch scheduler and root scheduler with the PSIM branch scheduler and PSIM root scheduler 316 as shown. In this embodiment, the branch scheduler 306 is used to simulate the PSIM root scheduler instead of using the actual root scheduler of the distributed virtualization management layer 130. In other embodiments, the PSIM Universe module 220 may have access to the root scheduler of the distributed virtualization management layer 130 and utilize the root scheduler instead of simulating the root scheduler with the branch scheduler.

A sample input file for the simulator is illustrated below. The input file is a command file that loads the various configurations for the simulator using specific commands.

```
# Configurations
seed 10000
# Configure simulator environment
load_flavors common/vm.yml
load_flavors common/ephemeral-disk.yml
load_datastores common/datastores.yml
# load schedulers and hosts
load_tree no_constraints/schedulers.yml
# Execute simulator
run no_constraints/requests.yml
# Results
check_results no_constraints/results.yml
```

The following section explains the above simulator commands in more detail. Note that the configuration files correspond to elements 202, 204, 206, and 208 illustrated in FIG. 2 in some embodiments. First, the seed command seeds a random number generator for the simulation. A seed is used so that the tests are repeatable, and the same results can be reproduced for the same configurations. Using the same seed in two different simulations will replicate the simulation and allow the results of each simulation to be compared to one another. The seed allows the simulator to be used as a test suite to verify the scheduling capabilities of the distributed virtualization management layer 130.

The load_flavors command loads the different flavors of VMs or datastores or other resource consumers or containers. As mentioned above, the flavors specify the configuration of the VM or datastore with respect to the type of resources they contain or consume. The simulator can be configured with all known datastores and VM flavors. The flavors used for the simulation are the actual flavors used by the distributed virtualization management layer 130 when the layer 130 is in operation. This allows the simulation to test the effectiveness of the schedulers using "real-world" scenarios. In the example shown, the flavors of the different VMs and datastores, as well as other input described below, are specified in one or more input files in a format that is parseable by input parser 210 (for example, such as the YML format, although other formats may be used).

The load_data stores command loads all the datastores needed for a simulator run. In the simulation, test fixtures may be used to simulate the datastores instead of actual physical datastores. That way, very large virtual computing environments can be simulated.

The load_tree command builds a complete scheduler tree that is needed to simulate the virtual computing environment. The simulator uses the actual virtual management system tree generator from the distributed virtualization management layer 130 to generate the tree from the host's configuration. By using the actual virtual management system tree generator, simulations can scale to 20,000 hosts or more. The host configuration can be specified in a single configuration, in which case each host will be the same. Alternatively, multiple host types can be specified along with their ratio in the total number of hosts. In that case, the simulator automatically generates the hosts without the user having to specify individual configurations. The datastore configurations for the hosts can also be specified as a range of datastores. The simulator will attach a varying number of datastores to each host. This flexible representation allows the user to specify the entire cloud configuration using just a few commands, leaving the configuration work to be performed by the simulator. Network constraints may also be set with this command, in the same manner as datastore configurations.

The run command specifies a request file that specifies the VM requests coming to the distributed virtualization management layer 130. The requests are described as patterns in a configuration file, which are then used by the simulator to generate the requests. This allows a large number of requests to be generated without creating large configurations files with detailed description of requests. The requests are specified using VM flavors known to the simulator. The distribution of the flavors can also be specified in the configuration file. Standard distribution types may be used, such as normal, Poisson, power-law, etc. The requests can therefore have different VM configurations as indicated by the distribution. Complicated patterns of requests can be generated to simulate the workload of a typical virtual computing environment with a high degree of accuracy. In addition to the flavor of the VM, the simulator also allows specification of runtime characteristics of the VM. One example of a runtime characteristic is the amount of memory consumed by the VM. The amount of memory can be specified as a range with a number that's uniformly random in the range, representing the VM's usage. This runtime characteristic is useful to specify scenarios where some VMs are more active than other VMs, allowing the simulation to determine how the scheduler behaves with that dynamic in the system.

The check_results command evaluates the results of the simulation. The simulator can calculate a set of metrics about the test run. Along with the number of requests that succeed or fail, the simulator can calculate the state of the hosts at the end of a simulator run. The simulator lists the hosts' average utilization and standard deviation values to indicate the balance of the entire cluster of hosts. The standard deviation number is one indicator of the effectiveness of the scheduler.

The check_results command can also validate constraints. For example, a VM may need access to a particular datastore. A corresponding constraint may instruct the distributed virtualization management layer 130 to place this VM only on a host that has access to the particular datastore. Once the simulation has run, the constraints can be checked to determine if they have been met.

Results can also be printed to output the simulation results in accordance with an embodiment. The result of each request can be output (for example, whether a VM allocation request resulted in a success or failure, and has been placed on which parent host). The simulation results indicating host status for the host after the simulated VM placement has occurred can also be output (total vs. used memory, CPU, and/or disk). In another embodiment, simulation results that include statistics associated with a cloud distribution of resources among all simulated hosts may be output. These statistics may include the mean amount of memory and disk used across simulated hosts after executing the VM requests, and other statistics (e.g., standard deviation). The statistics further include VM/host standard deviation and mean, such as a mean ratio of VMs-to-host after simulated execution of all generated requests. The statistics may be analyzed to determine the scheduling effectiveness of the distributed virtualization management layer 130.

Figure 4:
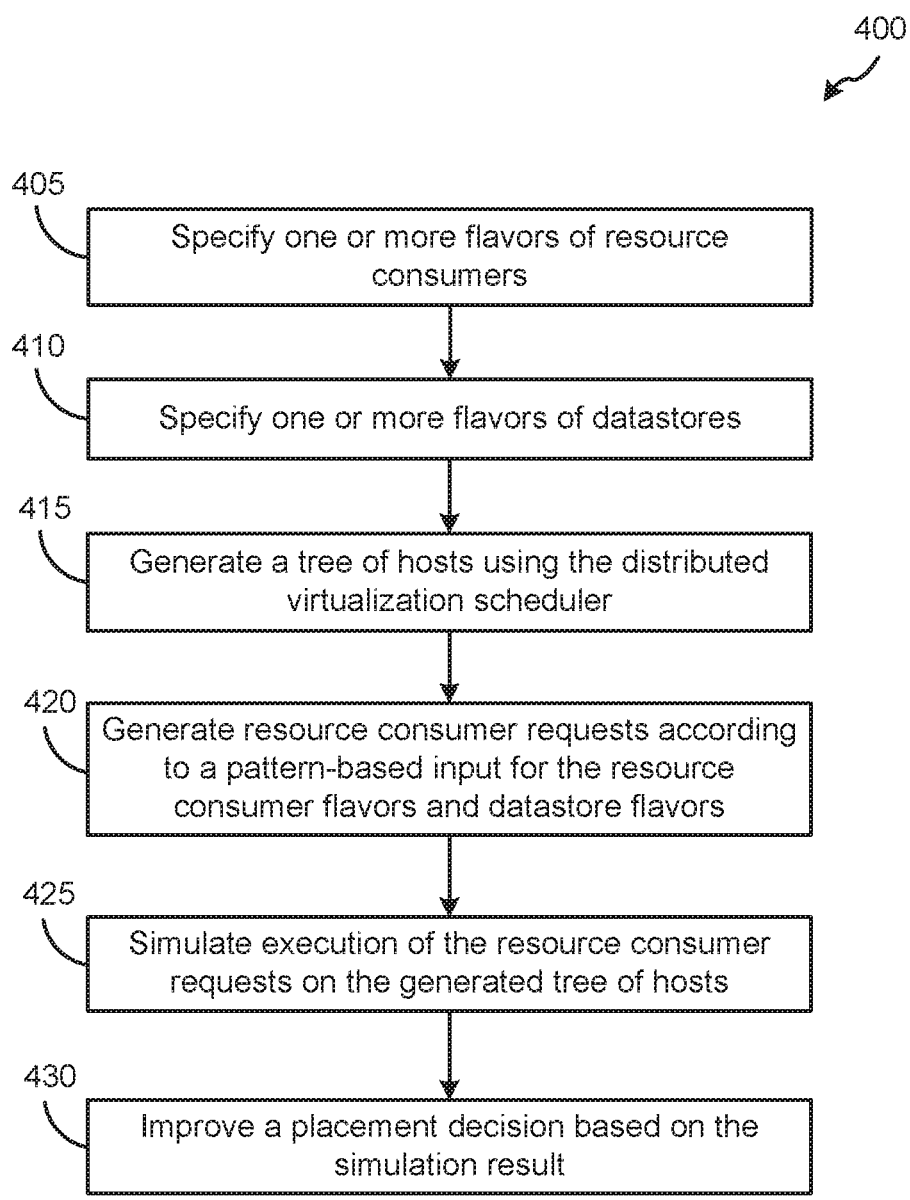
FIG. 4 is a flow diagram that illustrates a method of simulating a virtual computing environment.

FIG. 4 is a flow diagram that illustrates a method of simulating a virtual computing environment. Although the method steps are described in conjunction with the systems of FIGS. 1-3, persons skilled in the art will understand that any system configured to perform the method steps, in any order, falls within the scope of the present invention. In various embodiments, the hardware and/or software elements described above in FIGS. 1-3 can be configured to perform the method steps of FIG. 4. The resource consumers described in FIG. 4 may comprise virtual machines, containers, or any other type of resource consumer.

As shown, a method 400 begins at step 405 where a command file for the simulation specifies one or more flavors of resource consumers to be provisioned on a tree of hosts for a simulation of a distributed virtualization scheduler. The flavors specify the configuration of the resource consumer, and the flavors for the simulation are the same flavors used in the actual virtual computing environment. One method to specify the flavors is to load a configuration file specifying the resource consumer flavors. The flavors of the resource consumers may comprise any distribution, such as a normal distribution, Gaussian distribution, Poisson distribution, etc.

At step 410, the command file specifies one or more flavors of datastores to be provisioned on the tree of hosts for a simulation of the distributed virtualization scheduler. The flavors specify the configuration of the datastores, and the flavors for the simulation are the same flavors used in the actual virtual computing environment. One method to specify the flavors is to load a configuration file specifying the datastore flavors. The flavors of the datastores may comprise any suitable distribution.

At step 415, the distributed virtualization scheduler generates a tree of hosts for the resource consumers and datastores based on the specified flavors of resource consumers and datastores. The tree is generated using a tree generator component of the distributed virtualization scheduler. One or more schedulers (tree generator components such as root, branch, and leaf schedulers) of the distributed virtualization management layer 130 automatically generate the tree from the host's configuration. In some embodiments, multiple host types are specified along with their ratio in the total number of hosts. The datastore configuration for the hosts can also be specified as a range of datastores. Thus, the entire cloud configuration can be specified with a small number of commands in a command file, with the heavy work of generating the tree performed by the distributed virtualization management layer 130.

At step 420, the command file generates a plurality of resource consumer requests for the generated tree of hosts according to a pattern-based input, wherein the resource consumer requests comprise requests for the specified resource consumer flavors and the specified datastore flavors. The requests may be described as a pattern or patterns in a configuration file, which is then used by the simulator to generate the requests. Thus, a large number of requests can be generated without providing detailed descriptions of the requests. The requests can be specified using resource consumer flavors that are known to the simulator. The distribution of the flavors may be specified in the configuration file using standard distribution types. As a result, complicated patterns of requests can be used to simulate the workload of a typical virtual computing environment.

At step 425, the simulator simulates execution of the resource consumer requests on the generated tree of hosts. The requests are allocated by schedulers such as the leaf and branch schedulers. During this allocation step, the distributed virtualization scheduler distributes resource consumers and datastores among the tree of hosts pursuant to any criteria or constraints specified for the simulation. Various results of the simulation can be tracked, such as the result of each resource consumer request (Success/Failure, parent host), the host status, and the distribution of resource consumers.

After the simulation is complete, the simulator may calculate one or more metrics to evaluate results of the allocation of the resource consumer requests. For example, the hosts' average utilization and standard deviation can indicate the balance of the entire cluster of hosts. The number of failures and successes can be checked. Constraints on the resource consumers or on the virtual computing environment may also be validated in this step.

At step 430, a result of the simulated execution is utilized to improve a placement decision for a resource consumer. For example, a user may view the results of the simulation and use those results to improve placement decisions for virtual machines or containers onto resources. Constraints may be adjusted based on the results of the simulation to improve placement decisions.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. These embodiments may also apply to other examples of contexts, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The various embodiments described herein may employ various computer-implemented operations involving data stored in computer systems. For example, these operations may require physical manipulation of physical quantities usually, though not necessarily, these quantities may take the form of electrical or magnetic signals, where they or representations of them are capable of being stored, transferred, combined, compared, or otherwise manipulated. Further, such manipulations are often referred to in terms, such as producing, identifying, determining, or comparing. Any operations described herein that form part of one or more embodiments of the invention may be useful machine operations. In addition, one or more embodiments of the invention also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present invention may be implemented as one or more computer programs or as one or more computer program modules embodied in one or more computer readable media. The term computer readable medium refers to any data storage device that can store data which can thereafter be input to a computer system computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present invention have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

In addition, while described virtualization methods have generally assumed that virtual machines present interfaces consistent with a particular hardware system, persons of ordinary skill in the art will recognize that the methods described may be used in conjunction with virtualizations that do not correspond directly to any particular hardware system. Virtualization systems in accordance with the various embodiments may be implemented as hosted embodiments, non-hosted embodiments or as embodiments that tend to blur distinctions between the two, are all envisioned. Furthermore, various virtualization operations may be wholly or partially implemented in hardware. For example, a hardware implementation may employ a look-up table for modification of storage access requests to secure non-disk data.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

We claim:

1. A method for simulating a virtual computing environment, comprising:
    specifying one or more types of resource consumers to be provisioned on a tree of hosts for a simulation of a distributed virtualization scheduler;
    specifying one or more types of datastores to be provisioned on the tree of hosts for the simulation of the distributed virtualization scheduler;
    generating a tree of hosts for the resource consumers and datastores based on the specified types of resource consumers and datastores and using a tree generator component of the distributed virtualization scheduler, wherein the tree generator component comprises a root scheduler and a branch scheduler, and wherein the tree generator component employs the branch scheduler to simulate the root scheduler;
    generating a plurality of resource consumer requests for the generated tree of hosts according to a pattern-based input, wherein the resource consumer requests comprise requests for the specified resource consumer types and the specified datastore types, and wherein the plurality of resource consumer requests comprises a standard distribution of the one or more types of resource consumers;
    simulating execution of the resource consumer requests on the generated tree of hosts using the distributed virtualization scheduler; and
    utilizing a result of the simulated execution to improve a placement decision for a resource consumer.

2. The method of claim 1, further comprising:
    calculating one or more metrics to evaluate the execution of the resource consumer requests by the distributed virtualization scheduler, wherein one of the one or more metrics is compared to a predefined constraint to validate a result of the simulation.

3. The method of claim 2, wherein one of the one or more metrics comprises a status of each resource consumer request.

4. The method of claim 1, wherein the resource consumer is a virtual machine.

5. The method of claim 1, wherein generating a tree of hosts comprises using a leaf scheduler and a branch scheduler of the distributed virtualization scheduler to generate the tree of hosts.

6. The method of claim 1, wherein the resource consumer is a container.

7. The method of claim 1, further comprising specifying the standard distribution of the one or more types of resource consumers in a configuration file.

8. A non-transitory computer-readable storage medium containing a program which, when executed by one or more processors, performs operations for simulating a virtual computing environment, the operations comprising:
    specifying one or more types of resource consumers to be provisioned on a tree of hosts for a simulation of a distributed virtualization scheduler;
    specifying one or more types of datastores to be provisioned on the tree of hosts for the simulation of the distributed virtualization scheduler;
    generating a tree of hosts for the resource consumers and datastores based on the specified types of resource consumers and datastores and using a tree generator component of the distributed virtualization scheduler wherein the tree generator component comprises a root scheduler and a branch scheduler, and wherein the tree generator component employs the branch scheduler to simulate the root scheduler;
    generating a plurality of resource consumer requests for the generated tree of hosts according to a pattern-based input, wherein the resource consumer requests comprise requests for the specified resource consumer types and the specified datastore types, and wherein the plurality of resource consumer requests comprises a standard distribution of the one or more types of resource consumers;
    simulating execution of the resource consumer requests on the generated tree of hosts using the distributed virtualization scheduler; and
    utilizing a result of the simulated execution to improve a placement decision for a resource consumer.

9. The non-transitory computer-readable storage medium of claim 8, wherein the operations further comprise:
    calculating one or more metrics to evaluate the execution of the resource consumer requests by the distributed virtualization scheduler, wherein one of the one or more metrics is compared to a predefined constraint to validate a result of the simulation.

10. The non-transitory computer-readable storage medium of claim 9, wherein one of the one or more metrics comprises a status of each resource consumer request.

11. The non-transitory computer-readable storage medium of claim 8, wherein the resource consumer is a virtual machine.

12. The non-transitory computer-readable storage medium of claim 8, wherein generating a tree of hosts further comprises using a leaf scheduler and the branch scheduler of the distributed virtualization scheduler to generate the tree of hosts.

13. The non-transitory computer-readable storage medium of claim 8, wherein the resource consumer is a container.

14. The non-transitory computer-readable storage medium of claim 8, further comprising specifying the standard distribution of the one or more types of resource consumers in a configuration file.

15. A system, comprising:
    a processor; and
    a memory, wherein the memory includes a program executable in the processor to perform operations for simulating a virtual computing environment, the operations comprising:
    specifying one or more types of resource consumers to be provisioned on a tree of hosts for a simulation of a distributed virtualization scheduler;
    specifying one or more types of datastores to be provisioned on the tree of hosts for the simulation of the distributed virtualization scheduler;
    generating a tree of hosts for the resource consumers and datastores based on the specified types of resource consumers and datastores and using a tree generator component of the distributed virtualization scheduler; wherein the tree generator component comprises a root scheduler and a branch scheduler, and wherein the tree generator component employs the branch scheduler to simulate the root scheduler;

generating a plurality of resource consumer requests for the generated tree of hosts according to a pattern-based input, wherein the resource consumer requests comprise requests for the specified resource consumer types and the specified datastore types, and wherein the plurality of resource consumer requests comprises a standard distribution of the one or more types of resource consumers;

simulating execution of the resource consumer requests on the generated tree of hosts using the distributed virtualization scheduler; and utilizing a result of the simulated execution to improve a placement decision for a resource consumer.

16. The system of claim 15, wherein the operations further comprise:

calculating one or more metrics to evaluate the execution of the resource consumer requests by the distributed virtualization scheduler, wherein one of the one or more metrics is compared to a predefined constraint to validate a result of the simulation.

17. The system of claim 15, wherein the resource consumer is a virtual machine.

18. The system of claim 15, wherein the resource consumer is a container.

19. The system of claim 15, wherein generating a tree of hosts further comprises using a leaf scheduler and the branch scheduler of the distributed virtualization scheduler to generate the tree of hosts.

20. The system of claim 15, wherein the standard distribution of the one or more types of resource consumers is specified in a configuration file.

* * * * *